(12) United States Patent
Perlo et al.

(10) Patent No.: US 9,981,624 B2
(45) Date of Patent: May 29, 2018

(54) SEAT ASSEMBLY WITH AIR BAG

(71) Applicants: Interactive Fully Electrical Vehicles S.R.L., Sommariva del Bosco (CN) (IT); Poli-Model S.R.L., Moncalieri (TO) (IT)

(72) Inventors: Pietro Perlo, Rivoli (IT); Pietro Guerrieri, Rivoli (IT)

(73) Assignees: Interactive Fully Electrical Vehicles S.R.L., Sommariva del Bosco (CN) (IT); Poli-Model S.R.L., Moncalieri (TO) (IT)

( * ) Notice: Subject to any disclaimer, the term of this patent is extended or adjusted under 35 U.S.C. 154(b) by 0 days. days.

(21) Appl. No.: 15/129,685

(22) PCT Filed: Mar. 11, 2015

(86) PCT No.: PCT/IB2015/051771
§ 371 (c)(1),
(2) Date: Sep. 27, 2016

(87) PCT Pub. No.: WO2015/145285
PCT Pub. Date: Oct. 1, 2015

(65) Prior Publication Data
US 2017/0144622 A1    May 25, 2017

(30) Foreign Application Priority Data
Mar. 27, 2014 (IT) .............. TO2014A00258

(51) Int. Cl.
*B60R 21/207* (2006.01)
*B60R 21/233* (2006.01)
(Continued)

(52) U.S. Cl.
CPC .......... *B60R 21/207* (2013.01); *B60R 21/233* (2013.01); *B60R 21/237* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 3,953,049 A | * | 4/1976 | Surace | B60R 21/08 280/730.1 |
| 4,440,443 A | * | 4/1984 | Nordskog | A47C 7/38 297/217.4 |

(Continued)

FOREIGN PATENT DOCUMENTS

| | | | | |
|---|---|---|---|---|
| DE | 4334896 A1 | * | 4/1995 | ............... B60N 2/48 |
| DE | 19859988 A1 | * | 6/2000 | ........... B60R 21/207 |

(Continued)

OTHER PUBLICATIONS

International Preliminary Report on Patentability dated Sep. 27, 2016, issued in PCT Application No. PCT/IB2015/051771 filed Mar. 11, 2015.

(Continued)

*Primary Examiner* — Nicole T Verley
(74) *Attorney, Agent, or Firm* — Workman Nydegger

(57) ABSTRACT

A seat assembly for a motor vehicle includes: a supporting structure, designed to be mounted on the floor panel of the motor vehicle; a seat, which is mounted on the supporting structure and includes a sitting portion and a backrest portion; and an airbag unit, including at least one airbag, which is folded into a housing provided in the seat assembly and is inflatable into an expanded condition outside the housing, whereby the at least one airbag has a conformation such that, in the expanded condition, the at least one airbag identifies a protection wall that surrounds the backrest portion of the seat.

8 Claims, 5 Drawing Sheets

(51) Int. Cl.
  *B60R 21/237* (2006.01)
  *B60R 21/00* (2006.01)
  *B60R 21/231* (2011.01)

(52) U.S. Cl.
  CPC ............... *B60R 2021/0041* (2013.01); *B60R 2021/0044* (2013.01); *B60R 2021/0048* (2013.01); *B60R 2021/0055* (2013.01); *B60R 2021/0058* (2013.01); *B60R 2021/23107* (2013.01); *B60R 2021/23153* (2013.01); *B60R 2021/23161* (2013.01)

(56) References Cited

U.S. PATENT DOCUMENTS

| | | | | |
|---|---|---|---|---|
| 6,315,245 | B1 * | 11/2001 | Ruff | B64D 25/02 |
| | | | | 244/122 AG |
| 8,485,551 | B2 * | 7/2013 | Dainese | B60R 21/207 |
| | | | | 280/730.1 |
| 9,533,651 | B1 * | 1/2017 | Ohno | B60R 21/23138 |
| 9,573,553 | B2 * | 2/2017 | Ko | B60R 21/233 |
| 2013/0015642 | A1 * | 1/2013 | Islam | B60R 21/207 |
| | | | | 280/730.1 |
| 2015/0108744 | A1 * | 4/2015 | Line | B60N 2/6009 |
| | | | | 280/730.2 |
| 2016/0347272 | A1 * | 12/2016 | Kato | B60R 21/207 |
| 2017/0015272 | A1 * | 1/2017 | Ohno | B60R 21/23138 |
| 2017/0028960 | A1 * | 2/2017 | Kobayashi | B60N 2/42 |
| 2017/0057456 | A1 * | 3/2017 | Ohno | B60R 21/23138 |
| 2017/0203711 | A1 * | 7/2017 | Ohno | B60R 21/203 |

FOREIGN PATENT DOCUMENTS

| | | | |
|---|---|---|---|
| DE | 10105561 A1 * | 8/2002 | ........... B60R 21/207 |
| DE | 10106238 A1 * | 9/2002 | ........... B60R 21/207 |
| DE | 10 2009 040 641 A1 | 4/2010 | |
| EP | 1 193 141 A2 | 4/2002 | |
| EP | 2 546 111 A1 | 1/2013 | |
| FR | 2 667 831 A | 4/1992 | |
| FR | 2667831 A1 * | 4/1992 | ........... B60R 21/207 |
| JP | 2016222073 A * | 12/2016 | |
| KR | 10-2008-0080968 | 5/2009 | |

OTHER PUBLICATIONS

International Search Report dated Jun. 8, 2015, issued in PCT Application No. PCT/IB2015/051771 filed Mar. 11, 2015.

* cited by examiner

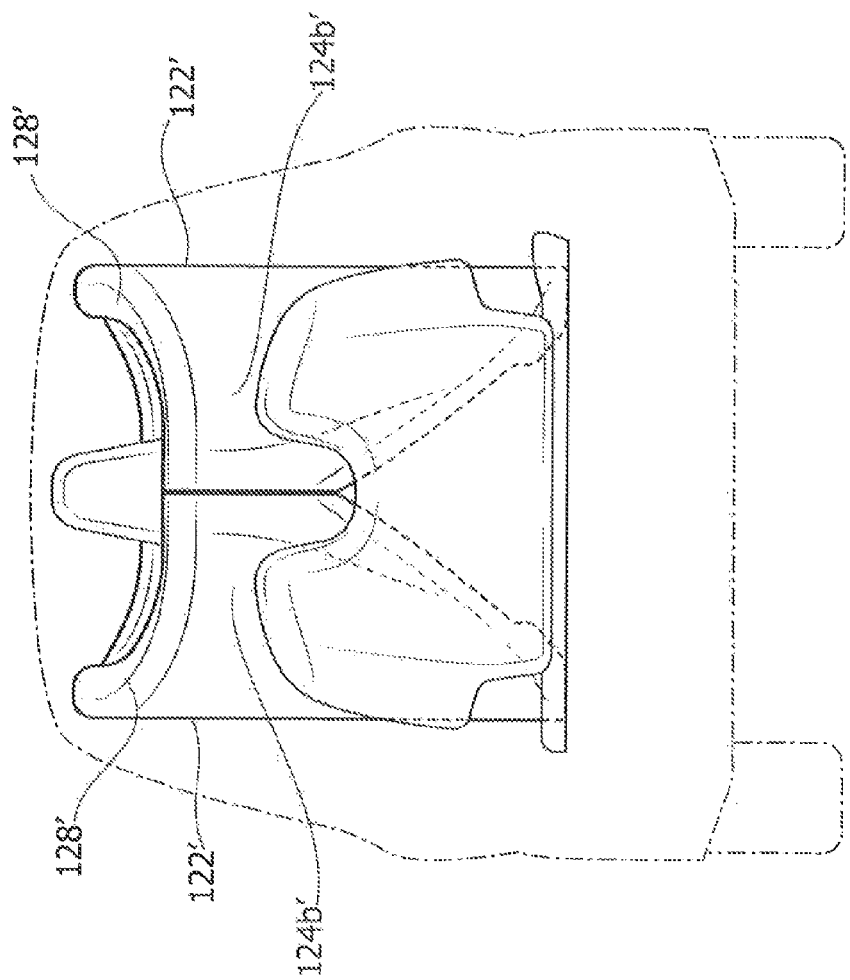

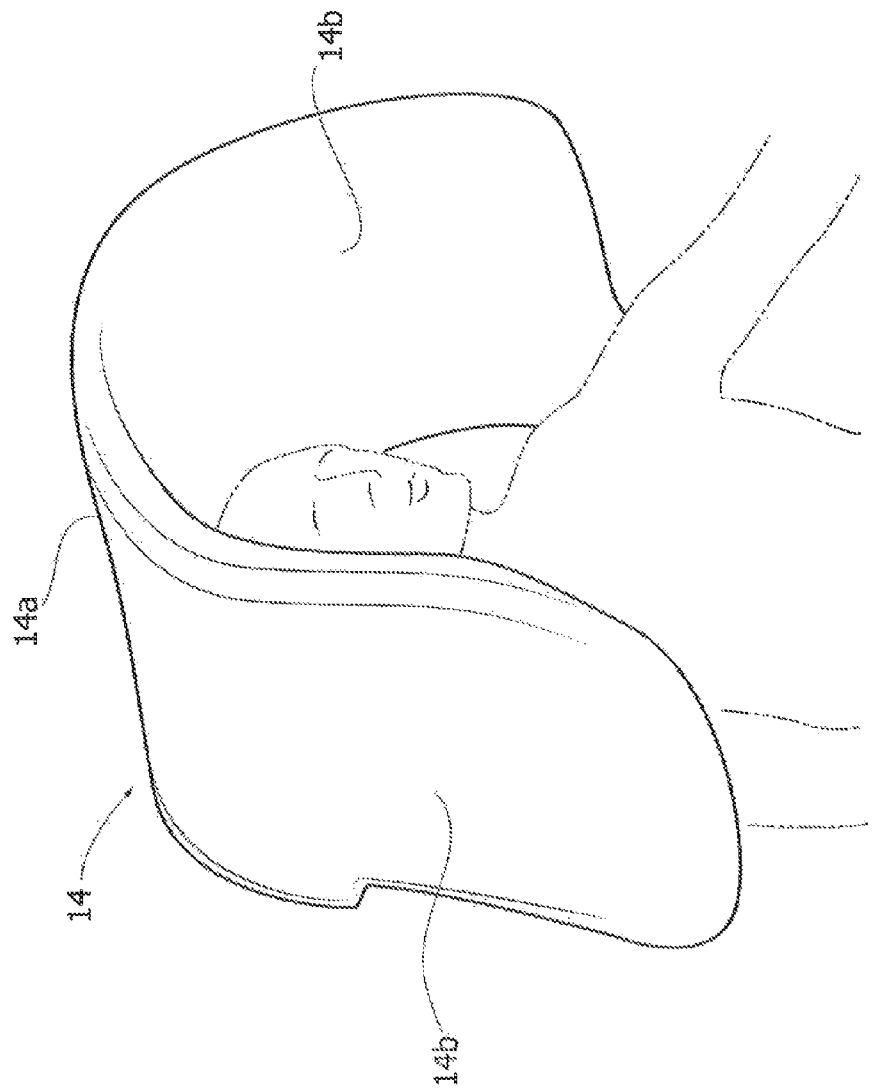

SEAT ASSEMBLY WITH AIR BAG

FIELD OF THE INVENTION

The present invention relates to a seat assembly for a motor vehicle, of the type comprising:
- a supporting structure, designed to be mounted on the floor panel of a motor vehicle;
- a seat, which is mounted on said supporting structure and comprises a sitting portion and a backrest portion; and
- an airbag unit, comprising at least one airbag, which is folded into a housing provided in said seat assembly and is inflatable into an expanded condition outside said housing.

PRIOR ART

As is known, various types of airbags can be installed on a motor vehicle, amongst which, to cite just a few, airbags for the front seats, which exit from the dashboard of the motor vehicle, airbags for the rear seats, which exit from the backrests of the front seats, side airbags, which exit from the doors, and top airbags or curtain airbags, which exit from the top of the door openings. The various types of airbags differ from one another first of all as regards the shape and size of the "cushion" or bag, as well as for the different calibration and different positioning of the sensors that activate them.

It is clear that the greater the number of types of airbags combined together inside the passenger compartment, the higher the level of safety that is reached. However, the higher the number of airbags, the higher the costs of production of the motor vehicle, on account, of course, of the number of airbags, but also on account of having to arrange the different parts of the passenger compartment that are to receive them appropriately.

For the above reasons, in the past only upper-range vehicles were provided with a complete airbag equipment, whereas lower-range models of motor vehicles presented a lower number of airbags, for example just the front and side airbags.

Today, a high degree of safety is, however, required also for motor vehicles belonging to the segments of city cars and family cars of small and medium size. As regards this type of motor vehicles, there is hence a constant need for new systems that will be, on the one hand, able to guarantee a high degree of safety and, on the other hand, will at the same time present structures that are relatively simple and have low production costs.

OBJECT OF THE INVENTION

In the above context, the object of the present invention is to provide a seat assembly equipped with airbags that will meet the needs referred to above. This object is achieved via a seat assembly having the characteristics specified in the claims. As will be seen in what follows, the seat assembly described herein is particularly suited for use on so-called "city cars".

The claims form an integral part of the technical teaching provided herein in relation to the invention.

BRIEF DESCRIPTION OF THE DRAWINGS

Further characteristics and advantages of the invention will emerge clearly from the ensuing description, with reference to the annexed drawings, which are provided purely by way of non-limiting example and in which:

FIGS. 3 and 4 are, respectively, a front view and a rear view of the passenger compartment of FIG. 1; and FIG. 5 illustrates a detail of the seat assembly described herein, in which the airbag unit is in an activated condition.

Figure 1:
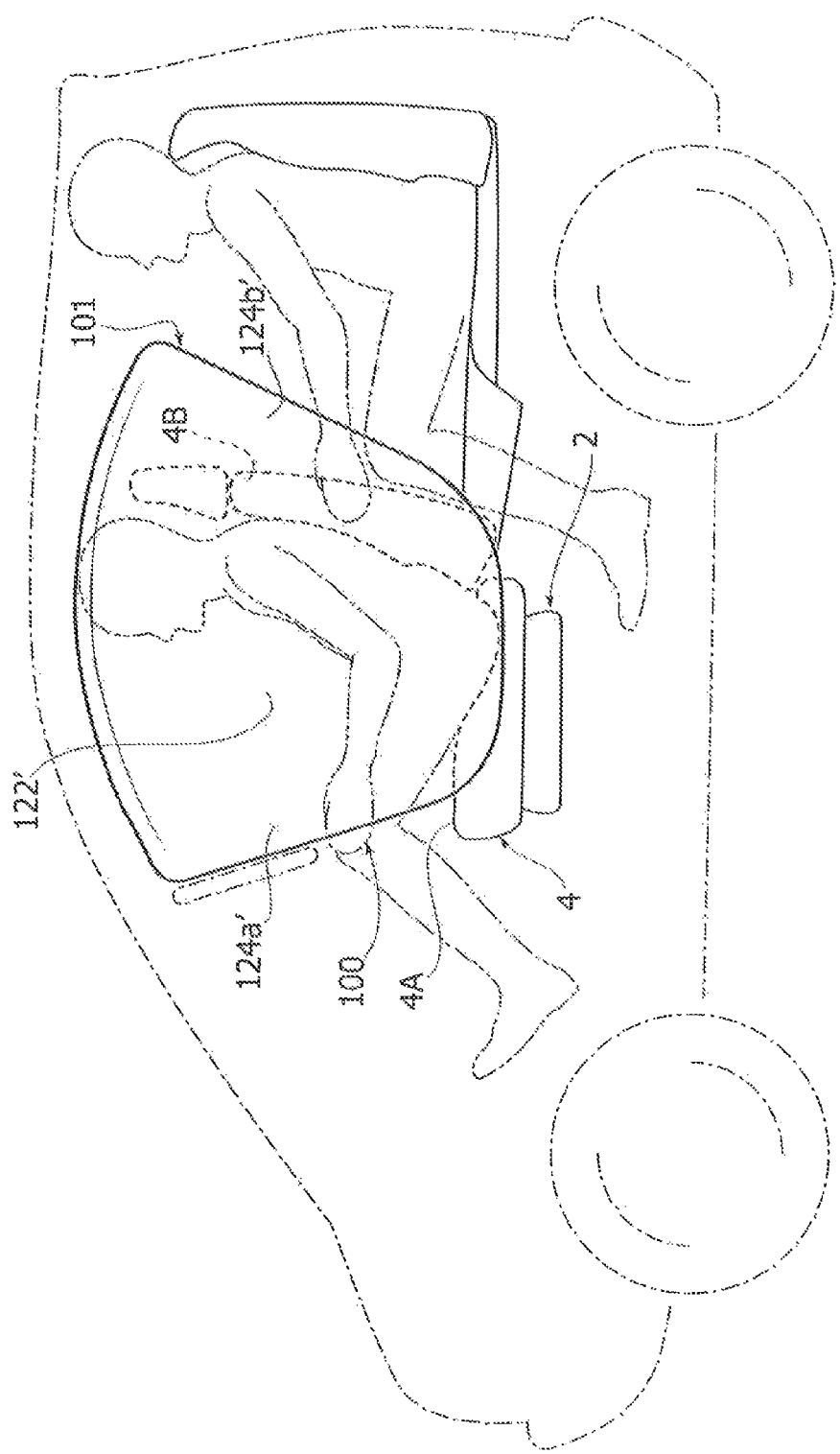
FIG. 1 illustrates a schematic side view of the passenger compartment of a car in which the seat assembly described herein is installed and in which the airbag unit of the seat assembly is in an activated condition.
Figure 2:
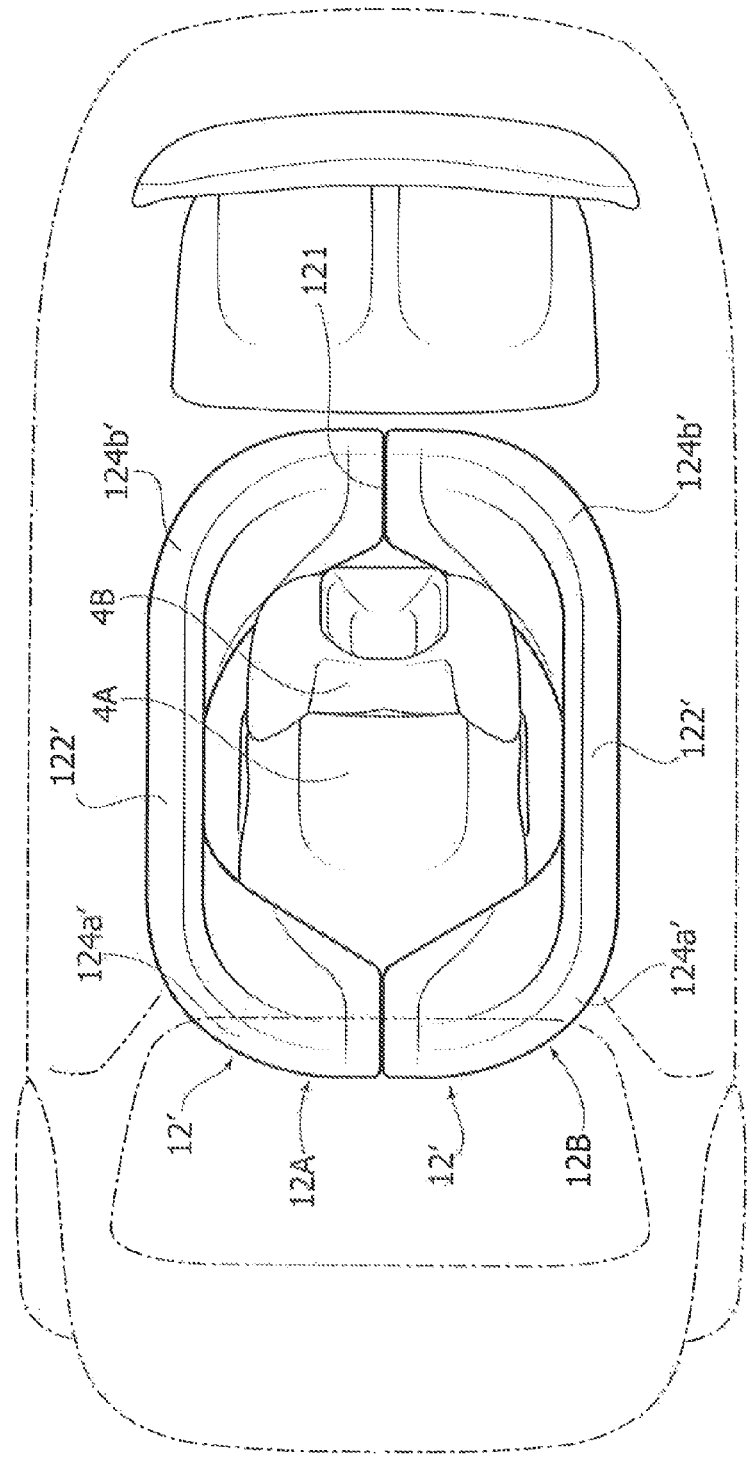
FIG. 2 illustrates a front view of the passenger compartment of FIG. 1.
Figure 3:
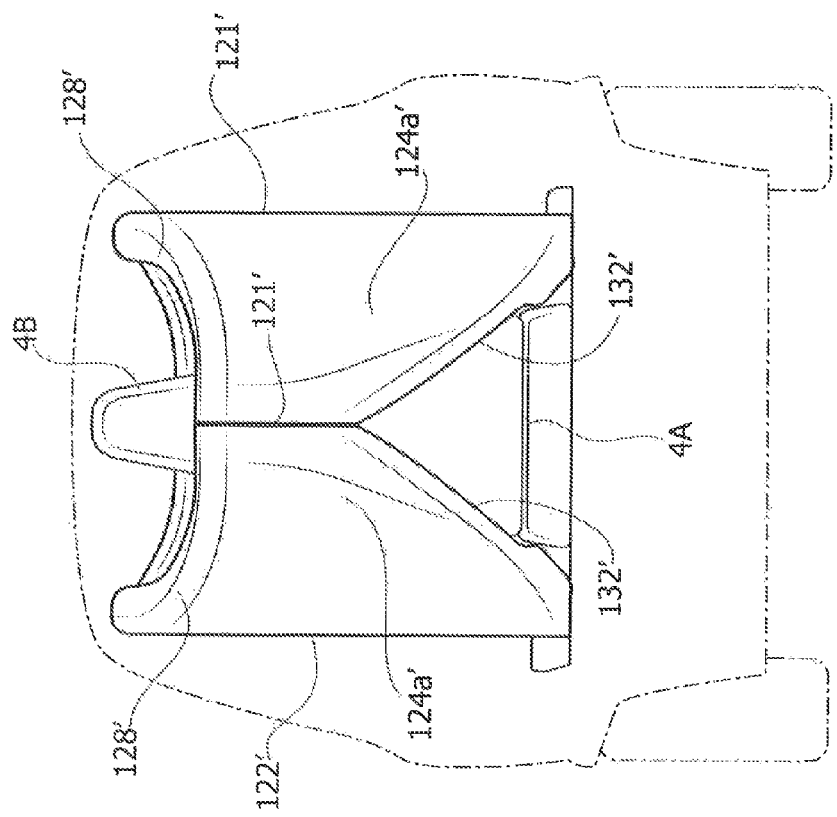

In the ensuing description, various specific details are illustrated aimed at providing an in-depth understanding of the embodiments. The embodiments may be obtained without one or more of the specific details, or with other methods, components, materials, etc. In other cases, known structures, materials, or operations are not illustrated or described in detail herein so that various aspects of the embodiment will not be obscured.

The references used herein are provided merely for convenience and hence do not define the sphere of protection or the scope of the embodiments.

FIGS. 1 to 4 illustrate the passenger compartment of a car in which there is a single, central, front seat for the driver, and two rear seats for the passengers. This configuration of passenger compartment may, for example, be provided on a car of small dimensions, a so-called "city car", suited for transporting at most three passengers.

In the example illustrated, the seat assembly described herein, designated by the reference number 100, comes to define the central front seat. It is evident that the seat assembly described herein can also be installed on any other type of passenger compartment, so that the example illustrated is not to be considered as in any way limiting the sphere of application of the seat assembly in question. In any case, as will be seen in what follows, in the type of application illustrated, the seat assembly described herein affords particular advantages that will become evident in what follows.

In general, the seat assembly described herein comprises:
- a supporting structure 2, designed to be mounted on the floor panel of the car;
- a seat 4, which is mounted on the supporting structure and comprises a sitting portion 4A and a backrest portion 4B; and
- an airbag unit, comprising at least one airbag 12, which is folded into a housing provided in said seat assembly and is inflatable into an expanded condition outside said housing.

The airbag unit moreover comprises:
- one or more sensors, for detecting a sharp deceleration of the motor vehicle due to impact and for generating a control signal;
- an electronic control unit (ECU), provided for receiving and processing the control signal coming from the sensor and configured for sending a command for triggering an activation device;
- an activation device, also known as "detonator" or "trigger", for detonating the substances (e.g., sodium nitride) contained in an explosive capsule; and
- an explosive capsule, explosion of which develops a large amount of gas that inflates the cushion or bag.

Clearly, the sensors and the control unit are physically located in positions separate from the seat and, in particular, the sensors are arranged in various points of the vehicle to enable detection of any possible impact on different points of the bodywork.

It should in any case be noted that the above characteristics do not regard the innovative aspects of the seat assembly described herein and consequently will not be described in detail. The characteristics in question may hence be obtained according to any modality known to the person skilled in the sector.

An important characteristic of the seat assembly described herein lies, instead, in the fact that the airbag unit comprises a bag, or else a plurality of bags, having a conformation such that, in the expanded condition, the single bag, or else the plurality of bags together, defines/define a protection wall that surrounds the backrest portion of the seat. In particular, in the expanded condition the single bag, or else the plurality of bags, defines/define a protection wall having a front portion, set facing the backrest portion, a rear portion, set behind to the backrest portion, and opposite lateral portions, set at the opposite sides of the backrest portion.

As may be seen in the example illustrated in the figures, thanks to this characteristic, in the expanded condition the bag or bags of the airbag unit of the seat assembly described herein define as a whole a protective cushion that surrounds completely the passenger's upper body and head so as to protect the passenger from contact with the parts of the vehicle, whatever the direction of the impact undergone by the latter.

In various preferred embodiments, as in the one illustrated, the airbag unit comprises, specifically, a first bag 12A and a second bag 12B, which have respective conformations such as to together define, in the expanded condition, the protection wall referred to above. In various preferred embodiments, as in the one illustrated (see in particular FIG. 2), the first bag 12A and the second bag 12B define, in the expanded condition, two opposed walls 12', each of which is C-shaped in plan view and which come into mutual contact at their opposite end edges 121'. In even more preferred embodiments, these walls are oriented, with respect to the seat, so that the edges 121' are in mutual contact along a plane transverse to the sitting portion and to the backrest portion of the seat. In various embodiments, the walls in question each have a central portion 122', which is set facing the sides of the backrest portion and the space in front of the latter, at least for a part corresponding to the region of the sitting portion that is immediately adjacent to the backrest portion and extends in height by an amount at least equal to the height of the portion of the backrest. Each wall moreover has opposite lateral portions 124a', 124b', which extend from the central portion with a curvilinear profile so that the edges 121' are oriented in a direction substantially orthogonal to the direction of the central portion 122'. The front lateral portions 124a' together define a protection portion designed to protect the passenger frontally, this portion being of a height such as to be able to shield the passenger's upper body and head. The rear lateral portions 124b' define, instead, a rear protection portion, having a height such as to cover the rear side of the backrest portion completely.

In various preferred embodiments, starting from an intermediate area of the central portion, the walls 122' have a top edge 128' descending forwards, following a path such that it comes into contact with the roof of the passenger compartment and follows the profile of the parts of this with which it is in contact (see FIG. 1). Moreover, the front lateral portions 124a' of the walls have a bottom edge 132' rising towards the centre, in the direction of the opposed portion so as to provide a vertical space for the passenger's legs between said portion and the resting surface of the sitting portion of the seat (see FIG. 3).

It should be noted that the configuration just described can in any case be obtained also with a single bag, for example a bag of a tubular shape that closes on itself at opposed end edges, set in the front portion of the protection wall thus obtained.

The housings of the seat assembly that are to receive the two airbags in the folded condition are preferably provided in the supporting structure of the seat assembly. Preferably, they have a conformation in plan view that reproduces the C shape of the two bags, and evidently define an internal volume suited to receiving the two airbags in their folded condition. The specific structure of the housings and the way in which the airbags are folded in these housings, may be obtained according to the teachings already known in the technical field in question, and consequently will not be described in detail herein.

With reference once again to the example illustrated in the figures, it may be noted how in this application of the seat assembly, the protective cushion defined by the airbag unit—designated as a whole by the reference number 101—is in itself able to protect not only the passenger sitting on the seat assembly itself, but also the passengers sitting on the rear seat. In particular, it is able to protect these passengers frontally, protecting their head, upper body, and legs. This is made possible thanks to the fact that the seat assembly is set in the passenger compartment substantially centred with respect to the longitudinal axis of the passenger compartment itself and to the fact that the cushion of its airbag unit defines, in the expanded condition, a rear portion having a height such as to cover the rear side of the backrest portion completely, and a width substantially corresponding to the width of the sitting portion of the rear seat.

In the light of the foregoing, it is consequently evident how the airbag unit of the seat assembly described herein is able to guarantee a high level of safety within the passenger compartment, albeit with a simple and inexpensive structure.

In various embodiments, the seat assembly described herein may moreover comprise a further airbag unit integrated in the headrest of the seat. FIG. 5 illustrates, in the expanded condition, an example of the airbag, with which the airbag unit in question is equipped; this bag—designated by the reference 14—has a central horizontal portion 14A, designed to cover the area above the passenger's head, and two side flaps 14B, extending downwards, which, instead, are designed to protect the passenger's face laterally.

Of course, without prejudice to the principle of the invention, the details of construction and the embodiments may vary, even significantly, with respect to what has been illustrated herein purely by way of non-limiting example, without thereby departing from the scope of the invention, as defined by the annexed claims.

The invention claimed is:

1. A seat assembly for a motor vehicle, of the type comprising:
   a supporting structure, designed to be mounted on a floor panel of the motor vehicle;
   a seat, which is mounted on the supporting structure and comprises a sitting portion and a backrest portion; and
   an airbag unit, comprising at least one airbag, which is folded into a housing provided in said seat assembly and is inflatable into an expanded condition outside said housing,
   wherein said at least one airbag has a conformation such that, in its expanded condition, said at least one airbag identifies a protection wall that surrounds said backrest portion, and wherein said airbag unit comprises a first airbag and a second airbag, which define in the expanded condition two opposed walls, each being C-shaped in plan view, which come into mutual contact at their opposite end edges.

2. The assembly according to claim 1, wherein in said expanded condition said at least one airbag defines a protection wall having a front portion, set facing said backrest portion, a rear portion, set behind said backrest portion, and two opposite lateral portions, set at the opposite sides of said backrest portion.

3. The assembly according to claim 1, wherein said walls are oriented, with respect to the seat, so that said end edges are in mutual contact along a plane transverse to the sitting portion and to the backrest portion of said seat.

4. The assembly according to claim 1, wherein said walls each have a central portion, which is set facing the sides of the backrest portion and the space in front of the latter, at least for a part corresponding to the region of said sitting portion immediately adjacent to said backrest portion, and which extends in height by an amount at least equal to the height of said backrest portion.

5. The assembly according to claim 4, wherein said walls each have opposite front lateral portions and rear lateral portions, which extend from said central portion with a curvilinear profile so that said edges are oriented in a direction substantially orthogonal to the direction of said central portion.

6. The assembly according to claim 5, wherein the front lateral portions of said walls together define said front portion of said protection wall, whereas the rear lateral portions of said walls together define said rear portion of said protection wall.

7. The assembly according to claim 6, wherein said front lateral portions each have a bottom edge rising in the direction of the opposed portion so as to provide a vertical space for the passenger's legs between said portions and the resting surface of said sitting portion.

8. The assembly according to claim 2, wherein said front portion of said protection wall has a height such as to be able to shield at the front the passenger's upper body and head, or wherein said rear portion of said protection wall has a height such as to cover completely the rear side of said backrest portion.

* * * * *